(12) United States Patent
Fleischer et al.

(10) Patent No.: US 9,110,778 B2
(45) Date of Patent: Aug. 18, 2015

(54) ADDRESS GENERATION IN AN ACTIVE MEMORY DEVICE

(71) Applicant: International Business Machines Corporation, Armonk, NY (US)

(72) Inventors: Bruce M. Fleischer, Bedford Hills, NY (US); Thomas W. Fox, Hopewell Junction, NY (US); Hans M. Jacobson, White Plains, NY (US); Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 13/671,679

(22) Filed: Nov. 8, 2012

(65) Prior Publication Data

US 2014/0129799 A1    May 8, 2014

(51) Int. Cl.
   *G06F 12/10*   (2006.01)
   *G06F 12/02*   (2006.01)

(52) U.S. Cl.
   CPC ............... *G06F 12/02* (2013.01); *G06F 12/10* (2013.01)

(58) Field of Classification Search
   CPC .................................. G06F 12/10; G06F 12/02
   USPC ........................................................ 711/207
   See application file for complete search history.

(56) References Cited

U.S. PATENT DOCUMENTS

| 5,437,043 A * | 7/1995 | Fujii et al. ........................ 712/1 |
| 2004/0093465 A1 * | 5/2004 | Ramchandran ............... 711/131 |
| 2008/0059756 A1 * | 3/2008 | Du et al. ........................ 711/220 |
| 2010/0008126 A1 * | 1/2010 | Toda ............................. 365/148 |
| 2011/0167192 A1 | 7/2011 | Iyer et al. |
| 2011/0173371 A1 | 7/2011 | Karamcheti et al. |
| 2011/0228580 A1 | 9/2011 | Ozimek |
| 2012/0089792 A1 * | 4/2012 | Fahs et al. ..................... 711/154 |
| 2012/0137075 A1 | 5/2012 | Vorbach |
| 2012/0182804 A1 * | 7/2012 | Hung et al. .............. 365/185.13 |
| 2012/0233440 A1 * | 9/2012 | Stephens et al. .............. 711/220 |

FOREIGN PATENT DOCUMENTS

| EP | 1555616 | 7/2005 |
| WO | WO2009048707 | 4/2009 |

OTHER PUBLICATIONS

J. Draper, et al., "The Architecture of the DIVA Processing-In-Memory Chip," ICS '02, Jun. 22-26, 2002, NY, NY, Copyright 2002 ACM, 12 pages.

* cited by examiner

*Primary Examiner* — Cheng-Yuan Tseng
*Assistant Examiner* — Zubair Ahmed
(74) *Attorney, Agent, or Firm* — Cantor Colburn LLP

(57) ABSTRACT

Embodiments relate to address generation in an active memory device that includes memory and a processing element. An aspect includes a method for address generation in the active memory device. The method includes reading a base address value and an offset address value from a register file group of the processing element. The processing element determines a virtual address based on the base address value and the offset address value. The processing element translates the virtual address into a physical address and accesses a location in the memory based on the physical address.

15 Claims, 6 Drawing Sheets

ADDRESS GENERATION IN AN ACTIVE MEMORY DEVICE

BACKGROUND

The present invention relates generally to computer memory, and more particularly to address generation in an active memory device.

Computer systems often require a considerable amount of high speed memory, such as random access memory (RAM), to hold information, such as data and programs, when a computer is powered and operational. Memory device demands have continued to grow as computer systems have increased performance and complexity.

In a typical main memory application, a main processor specifies an address and either requests reading of the contents of memory or requests that the memory location is overwritten with some other contents that the main processor specifies. Communication from the main processor to locations on memory devices can involve relatively long data access times and latency. The time it takes for the main processor to access memory can be, for example, several hundred cycles, including time to realize the data is not in cache (for memory reads), time to traverse from a processor core of the main processor to I/O, across a module or other packaging, arbitration time to establish a channel to memory in a multi-processor/shared memory system, and time to get the data into or out of a memory cell.

SUMMARY

Exemplary embodiments include a method for address generation in an active memory device that includes memory and a processing element. The method includes reading a base address value and an offset address value from a register file group of the processing element. The processing element determines a virtual address based on the base address value and the offset address value. The processing element translates the virtual address into a physical address and accesses a location in the memory based on the physical address.

Additional exemplary embodiments include a processing element of an active memory device. The processing element includes a register file group including one or more register files and address generation logic coupled to the register file group. The address generation logic is configured to read a base address value and an offset address value from the register file group. The address generation logic is further configured to determine a virtual address based on the base address value and the offset address value. The address generation logic translates the virtual address into a physical address and outputs the physical address to access a location in memory of the active memory device by the processing element.

Further exemplary embodiments include an active memory device. The active memory device includes memory and a processing element. The processing element includes a register file group and address generation logic coupled to the register file group. The address generation logic is configured to perform a method including reading a base address value and an offset address value from the register file group. The address generation logic is further configured to determine a virtual address based on the base address value and the offset address value. The address generation logic translates the virtual address into a physical address and outputs the physical address to access a location in the memory.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
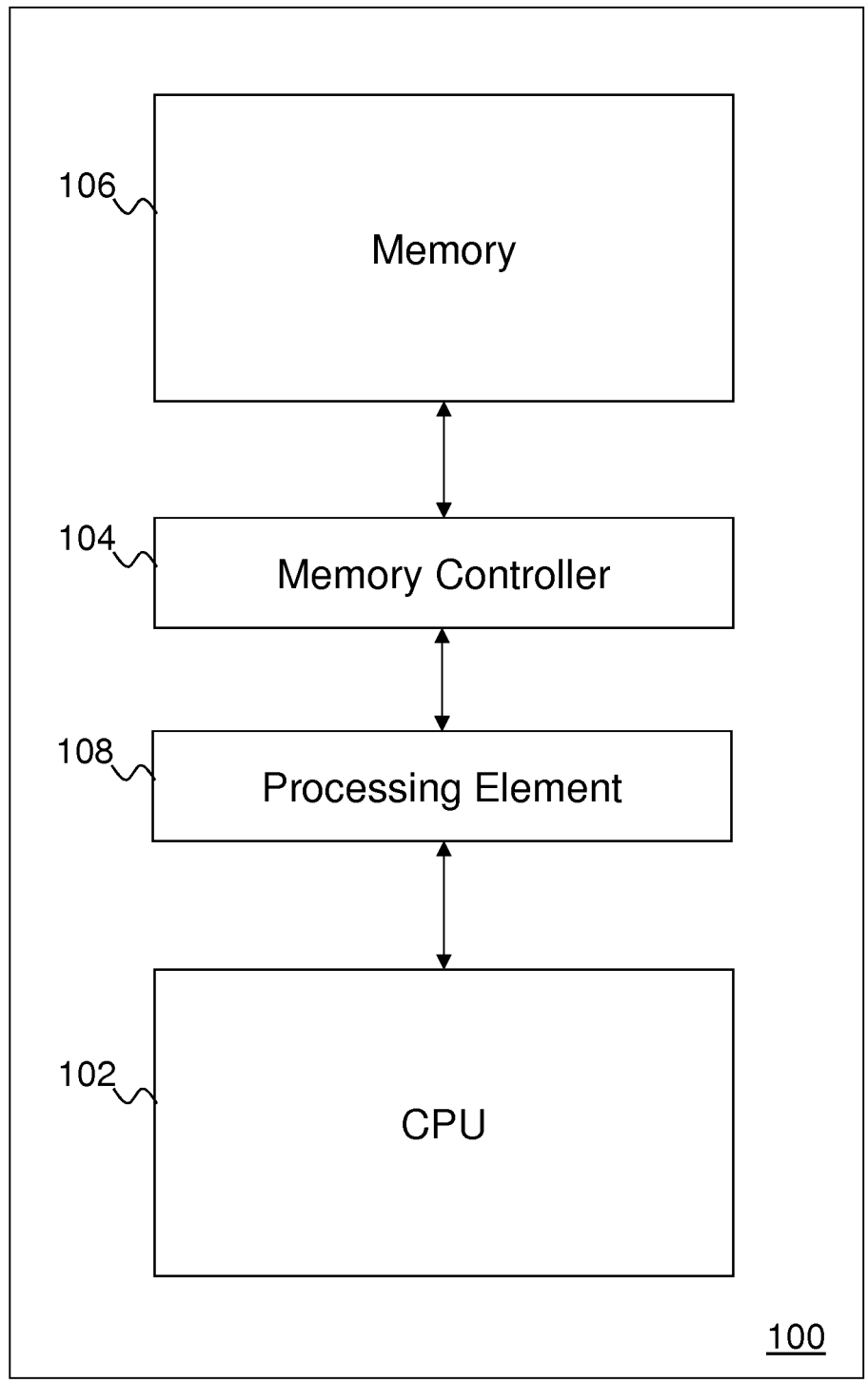
FIG. 1 illustrates a block diagram of a system for active memory in accordance with an embodiment.

An embodiment is directed to address generation in a processing element of an active memory device. The active memory device may be any suitable memory device including a plurality of memory elements (e.g., chips) connected to a logic portion and a processing element. In an embodiment, the active memory device includes layers of memory that form a three dimensional ("3D") memory device (e.g., a memory cube) where individual columns of chips form vaults in communication with the processing element and logic. The active memory device may include a plurality of processing elements configured to communicate to the chips and other processing elements. In an embodiment, a processing element accesses a selected address in a vault through an interconnect network. In addition, the interconnect network provides a communication path between processing elements on the active memory device as well as between processing elements and a main processor. Each vault may have an associated memory controller or logic unit that is also coupled to the interconnect network.

Embodiments include an active memory device that can perform a complex set of operations using multiple locations (e.g., data stored at specific addresses) within the active memory device as operands. Further, a process is provided whereby the instructions and operations are performed autonomously on these operands within the active memory device. Specifically, the instructions are stored within the active memory device itself and are not executed by a main processor. The stored instructions are provided to the processing elements for processing by the processing element in the active memory device. In one embodiment, the processing elements are programmable engines, including an instruction buffer, an instruction unit with branching capability and instruction decode, a mixture of vector and scalar register files, a plurality of load/store units for the movement of data between memory and the register files, and a plurality of execution units for the arithmetic and logical processing of various data types. Also included in the active memory device are address translation capabilities for converting virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-physical address translations that are computed while executing the loaded instructions. In an example, when performing a load instruction, the active memory device accesses an operand from a memory location and places the operand in a register in the processing element. A virtual address of the memory location is generated by the load instruction and is translated into a physical address by the processing element. Similarly, when performing a store instruction, the active memory device writes a memory location with the contents (e.g., an operand) in a register in the processing element. A virtual address of the memory location is generated by the store instruction and is translated into a physical address by the processing element.

Embodiments of the processing element in the active memory device also have the ability to read or to write operands in any part of the active memory device through the interconnect network. Specifically, a processing element may access other vaults in the active memory device using the interconnect network. In an embodiment, processing elements are pooled and coupled to the vaults via the interconnect network, where the processing elements are not physically located in the vault stack. In an embodiment, the interconnect network is a coupling device, such as a crossbar switch, configured to connect any processing element to any memory vault, provided the processing element and memory vault are coupled to the interconnect. In an embodiment, the interconnect network may couple a plurality of active memory devices, where the interconnect network provides a communication path between processing elements and memory vaults of separate devices.

In one embodiment, the processing element is included with the memory controller as part of the stack. In addition, the processing element may perform complex arithmetic and logic operations on the operands, and read and write end results back to locations in memory. The active memory device may return a single result value or signal to the main processor indicating that the results of the desired complex operation are ready in the active memory device, thus performing the high bandwidth processing on the active memory device and using a lower bandwidth communication between the active memory device and main processor.

The processing capabilities within an active memory device may reduce memory latency and energy consumption that would otherwise be experienced when memory is accessed by a processor residing in a separate chip. Instead of bringing data from memory to the separate processing chip through lower bandwidth communication paths, performing what is often quite simple calculations on the data, and then transferring the processed data back to memory, the main processor can configure the processing elements within the active memory device, and then instruct them to carry out the data processing tasks. This may be achieved by sending one or more commands from the main processor to the active memory device. In this scenario, the movement of data between the location where the data processing is performed and memory is greatly reduced, both in the distance it has to travel from the memory to the data processing location, and in the number of levels of cache traversed through a memory hierarchy.

FIG. 1 illustrates a block diagram of a system for storing and retrieving data in a memory in accordance with an embodiment. A system 100 depicted in FIG. 1 includes a computer processor (CPU) 102, a memory 106 having memory devices, as well as a memory controller 104 and processing element 108 for receiving and processing data from the computer processor 102 to be stored in the memory 106.

The memory controller 104 may be in communication with the computer processor 102 and receive write requests from the computer processor 102 without using functions of the processing element 108. The write requests contain data to be written to the memory 106 and a physical address for identifying the location in the memory 106 to which the data will be written. The memory controller 104 stores data at a physical address within the memory 106. The computer processor 102 can map the virtual address to a physical address in the memory 106 when storing or retrieving data.

In an embodiment, the processing element 108 is in communication with the computer processor 102 and receives a command from the computer processor 102. The command may correspond to instructions stored in the memory 106. The command may also include a virtual address for identifying the location in the memory 106 to which the data will be written. The memory controller 104 and/or processing element 108 stores data at a physical address within the memory 106. In an embodiment, the processing element 108 maps the virtual address to a physical address in the memory 106 when storing or retrieving data. As described in further detail below, the computer processor 102 provides commands to the memory 106, where the processing element 108 receives the command and fetches corresponding instructions from the memory 106. The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 and/or processing element 108 via a network). In addition, portions of the processing described herein may span one or more of the memory 106, memory controller 104, processing element 108 and computer processor 102.

Figure 2:
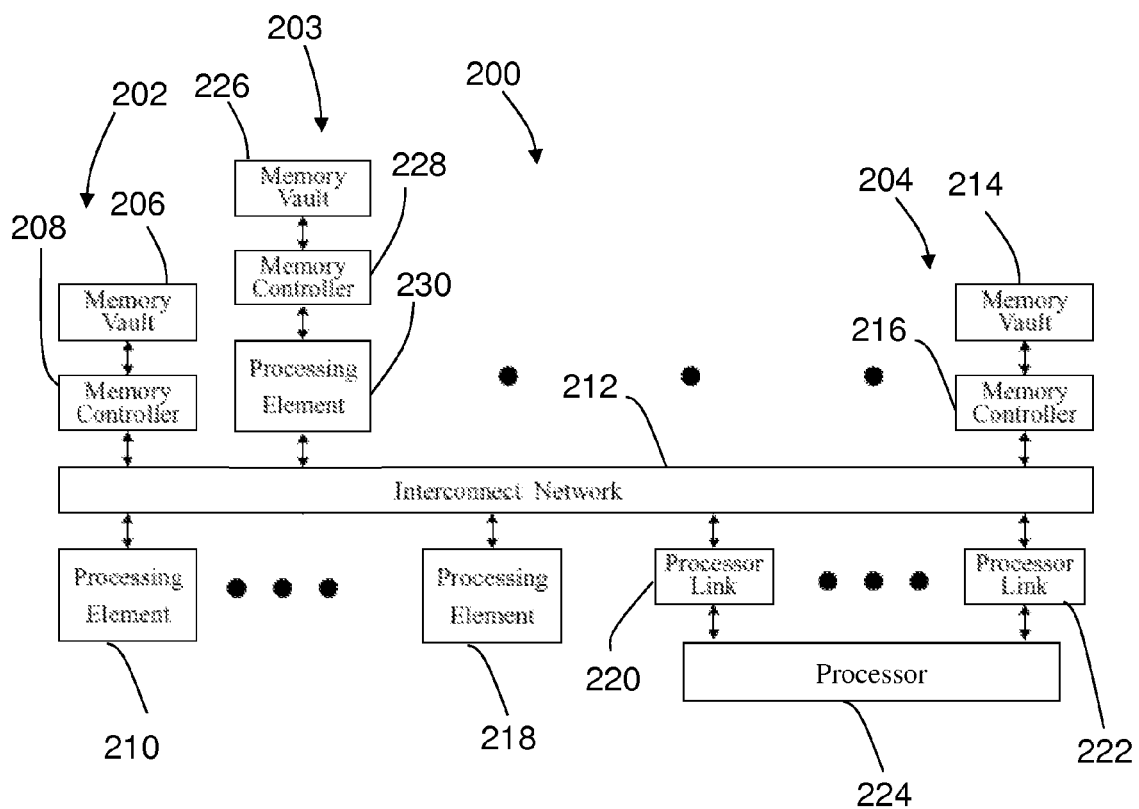
FIG. 2 illustrates a block diagram of a memory system with active memory in accordance with an embodiment.

FIG. 2 is a schematic diagram of an embodiment of a computer system 200 implementing active memory. In one embodiment, the computer system 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220 and 222. The interconnect network 212 provides a fast and high bandwidth path for communication between portions of the device, such as processing elements, memory controllers and memory, to provide improved performance and reduced latency for the active memory.

The active memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory 204 includes a memory vault 214 and memory controller 216 coupled to processing element 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stacks memory may be divided into memory vaults 206, 226 and 214, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing element, such as processing element 230, is located as part of a stack including a memory vault 226 and memory controller 228. In such a configuration, the processing element 230 is configured to access memory vault 226 without going through the interconnect network 212. The processing element 230 is also coupled to the interconnect network 212 and can access memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

In an embodiment, the computer system may include a plurality of active memory devices, such as the active memory devices 202, 203 and 204. Further, each active memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by processing elements of active memory devices coupled to the interconnect network.

Figure 3:
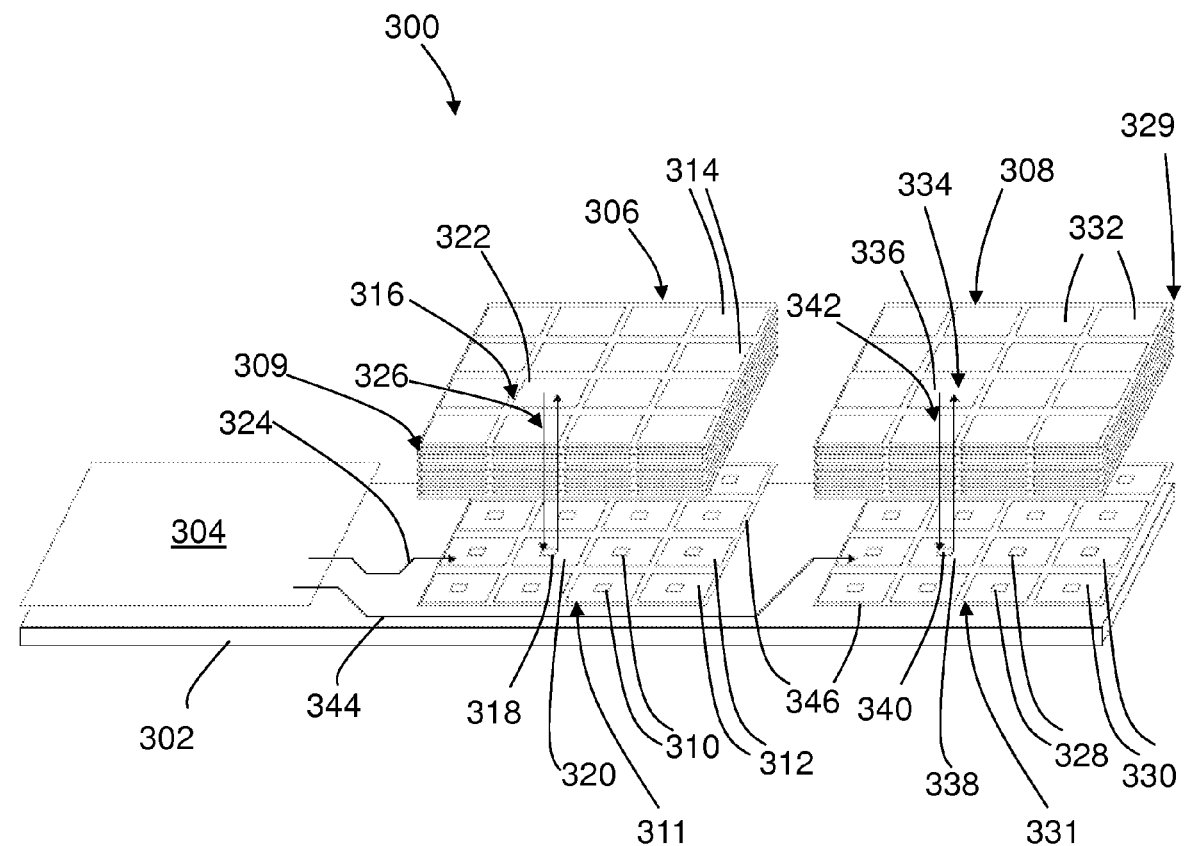
FIG. 3 illustrates a schematic diagram of a memory system with active memory in accordance with an embodiment.

FIG. 3 is a diagram of an exemplary computer system 300 implementing active memory. The computer system 300 includes a circuit board 302, a main processor 304, active memory device 306 and active memory device 308. The active memory device 306, active memory device 308 and main processor 304 are disposed on the circuit board 302. As depicted, portions of the active memory devices 306 and 308 are exploded to show details of the computer system 300 arrangement. The active memory devices 306 and 308 communicate to the main processor 304 via signal paths 324 and 344, respectively. As depicted, the active memory 306 device is arranged in layers, where a base layer 311 includes a plurality of memory controllers 310 and processing elements 312. For example, the active memory device 306 includes layers 309 of memory placed on top of the base layer 311, where the layers 309 each have a plurality of memory elements. As depicted, the base layer 311 also includes an interconnect network 346 to enable high bandwidth communication between memory, memory controllers and processing elements in the device.

In an embodiment, the active memory device 306 includes a plurality of memory vaults 314, where each memory vault 314 includes a memory element from each layer 309, the memory vaults 314 positioned adjacent to memory controllers 310 and processing elements 312. Specifically, the exemplary active memory device 306 includes layers of 16 memory elements, where the element layers form stacks, including a stack 316, where the stack 316 includes a memory vault 322 disposed above a memory controller 318 and a processing element 320. A high bandwidth communication path 326 provides a high bandwidth, direct and substantially reduced length (e.g., as compared to paths 324, 344) communication path between the processing element 320 and memory locations within the memory vault 322, thus reducing latency and power consumption for memory accesses. For example, the processing element 320 may receive a command from the main processor 304, load instructions from within the active memory device 306 based on the command, and, as part of the loaded instructions, access data at a location in the memory vault 314 and perform a complex operation on the data in the processing element 320. Further, the processing element 320 may also store data, such as the result, in the memory vault 314 and transmit a value or signal to the main processor 304 following execution of the command. In an embodiment, the processing element 320 stores or writes data (e.g. an operand) from a register in the processing element 320 to the memory vault 314. The processing element 320 is also configured to translate addresses from virtual-to-real as part of the read or store operations. Thus, the processing element 320 provides instruction loading, address translation, complex operations and other tasks local to the memory to reduce latency, save power and free up the main processor 304 to perform other tasks.

Similarly, the active memory device 308 includes a plurality of memory controllers 328 and processing elements 330 disposed on a base layer 331. In an embodiment, the active memory 308 includes layers 329 of memory devices placed on top of the base layer 331, where the layers 329 each have a plurality of memory devices. The base layer 331 also includes an interconnect network 346 to enable high bandwidth communication between memory and processing elements in the device. In an embodiment, the interconnect networks 346 of active memory device 306 and active memory device 308 are coupled and allow communication between processing elements and memory on separate devices.

In an embodiment, the active memory device 308 includes a plurality of memory vaults 332, where each memory vault 332 includes a memory element from each layer 309, the memory vaults 332 are positioned adjacent to memory controllers 328 and processing elements 330. The exemplary active memory device 308 includes 16 stacks, including stack 334, where the stack 334 includes a memory vault 336 disposed above a memory controller 340 and a processing element 338. A high bandwidth communication path 342 provides communication between the processing element 330 and memory locations within the memory vault 336.

Figure 4:
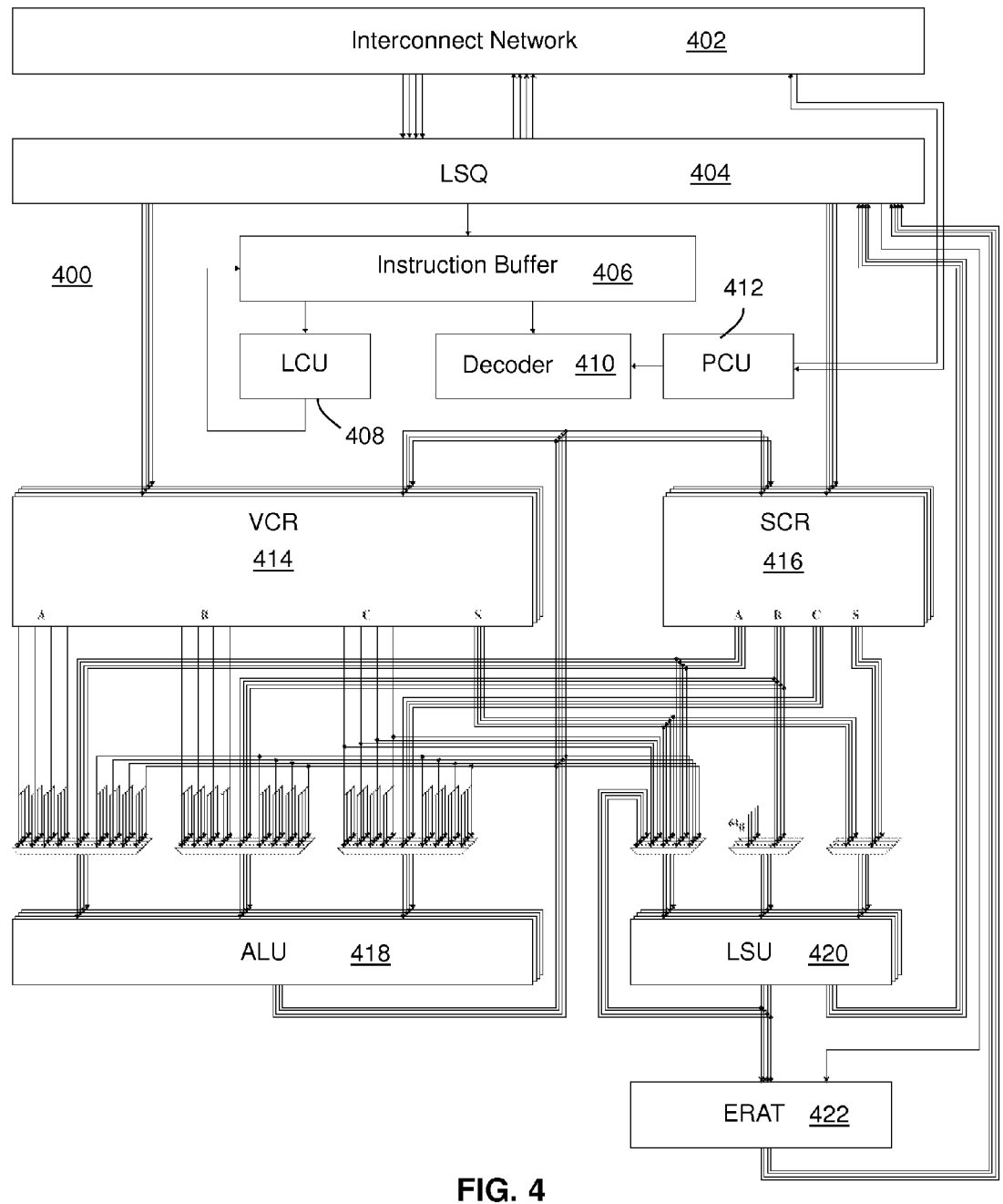
FIG. 4 illustrates a block diagram of a processing element in an active memory device in accordance with an embodiment.

FIG. 4 depicts an example of a processing element 400 coupled to an interconnect network 402 as an embodiment of one of the processing elements of FIGS. 1-3. The processing element 400 is a programmable vector processing element, situated in an active memory device, such as one of the active memory devices of FIGS. 1-3. In the example of FIG. 4, the processing element 400 includes a load-store queue (LSQ) 404 coupled to the interconnect network 402 and to an instruction buffer 406. The instruction buffer 406 is also coupled to a lane control unit (LCU) 408 and a decoder 410. A processor communication unit (PCU) 412 provides a communication interface between the processing element 400 and the main processor or other processing elements through the interconnect network 402. The LSQ 404 is also coupled to a vector computation register file (VCR) 414 and a scalar computation register file (SCR) 416. The VCR 414 and SCR 416 are coupled through multiple multiplexers to an arithmetic logic unit (ALU) 418 and a memory-access unit 420, also referred to as a load-store unit (LSU) 420. The ALU 418 is coupled to itself and to the LSU 420 through multiplexers, and is also coupled to the VCR 414 and the SCR 416. The LSU 420 may also be coupled to itself, to the LSQ 404, to an effective-to-real address translation unit (ERAT) 422 for virtual-to-physical address translation, to the VCR 414 and to the SCR 416 (all connections not depicted). The ERAT 422 is also coupled to the LSQ 404. As will be appreciated, numerous other connections and elements can be included in the processing element 400. For example, connections between the decoder 410 and other elements are not depicted for clarity. Additionally, depicted connections in FIG. 4 can be modified or omitted, such as the depicted connection between decoder 410 and PCU 412.

The processing element 400 supports an instruction set architecture including a broad range of arithmetic capabilities on many data types. Vector processing capabilities of the processing element 400 allows for single instruction, multiple data (SIMD) in time, while SIMD in a spatial dimension is also supported. The instruction buffer 406 holds instructions (also referred to as "lane instructions"), which are fetched and executed in order, subject to branching.

In an embodiment, each lane instruction contains 9 sub-instructions for execution in various units within the processing element 400. An iteration count may be included within the lane instruction, allowing the sub-instructions to be repeated up to a predetermined number of times (e.g., up to 32 times). This facilitates SIMD in time. The LCU 408 can manage the iteration count and determine when to advance to a next instruction or repeat execution of the same instruction.

In an embodiment, arithmetic pipelines of ALU 418 are 64 bits wide, and spatial SIMD is supported by virtue of the ability to execute data types smaller than 64 bits in parallel, simultaneously as multiple execution slots. For example, assuming that a lane instruction includes 9 sub-instructions, execution of the sub-instructions can be performed in the LCU 408 for lane control, and in four processing slices, each of which includes an ALU 418 and an LSU 420. Pairs of the VCR 414 and the SCR 416 can be implemented per processing slice and are accessible by each pair of the ALU 418 and LSU 420. Accordingly, the VCR 414, SCR 416, ALU 418, LSU 420, and associated multiplexers are depicted as stacks of four elements to indicate 4 processing slices in the example of FIG. 4.

At the processing slice level, computation can occur on floating-point and fixed-point data types at, for example, a 64-bit granularity in a temporal SIMD manner on 64-bit vector elements, and in a temporal and spatial SIMD manner on narrower vector sub-elements, which can be 32-bits, 16-bits, or 8-bits wide.

Each processing slice within the processing element 400 includes a memory access pipeline (load/store pipeline) and an arithmetic pipeline. Managing flow through the LSU 420 as a load/store pipeline can enable computation of one address per vector data element or sub-element. The processing element 400 provides the ability to perform associated fixed-point effective address (i.e., virtual address) computations. The arithmetic pipeline through the ALU 418 can include a robust assortment of floating-point and fixed-point operations to support a variety of workloads.

The LSU 420 may support load and store operations of, for example, 8, 4, 2 and 1 byte(s) and load and store operations of 4, 2, and 1 byte(s) to and from registers with packed data.

The ALU 418 may support copy operations between register files, arithmetic, rounding and conversion, comparison, and maximum and minimum operations on floating-point data types of double-precision (64 bits) and single-precision (32 bits), and arithmetic, rotate/shift, comparison, logical, count leading zeros, and ones population count operations on fixed-point data types of doubleword (64 bits), word (32 bits), halfword (16 bits) and bytes (8 bits).

In an embodiment, the computational model of a processing slice within the processing element 400 is a vector single instruction multiple data (SIMD) model with the VCR 414 and SCR 416. The VCR 414 can support multiple dimensions of registers, while the SCR 416 supports a single dimension of registers. For example, the VCR 414 can include 16 vector entries with 32 elements each of 64 bits, and the SCR 416 can include 16 register entries with 1 element each of 64 bits, although numerous other configurations may be supported. A variable number of execution slots can be used, operating on an equal number of sub-elements, whereby the sub-elements taken together add up to one register element (either VCR 414 or SCR 416) of 64 bits in this example. The number of execution slots and the corresponding number of vector sub-elements depend upon the data type of the instruction. Examples of data types and sizes of various formats include: floating-point with double-precision (64-bit) and single-precision (32-bit) data types and fixed-point for a doubleword (64-bit), word (32-bit), halfword (16-bit), and byte (8-bit) data types.

Figure 5:
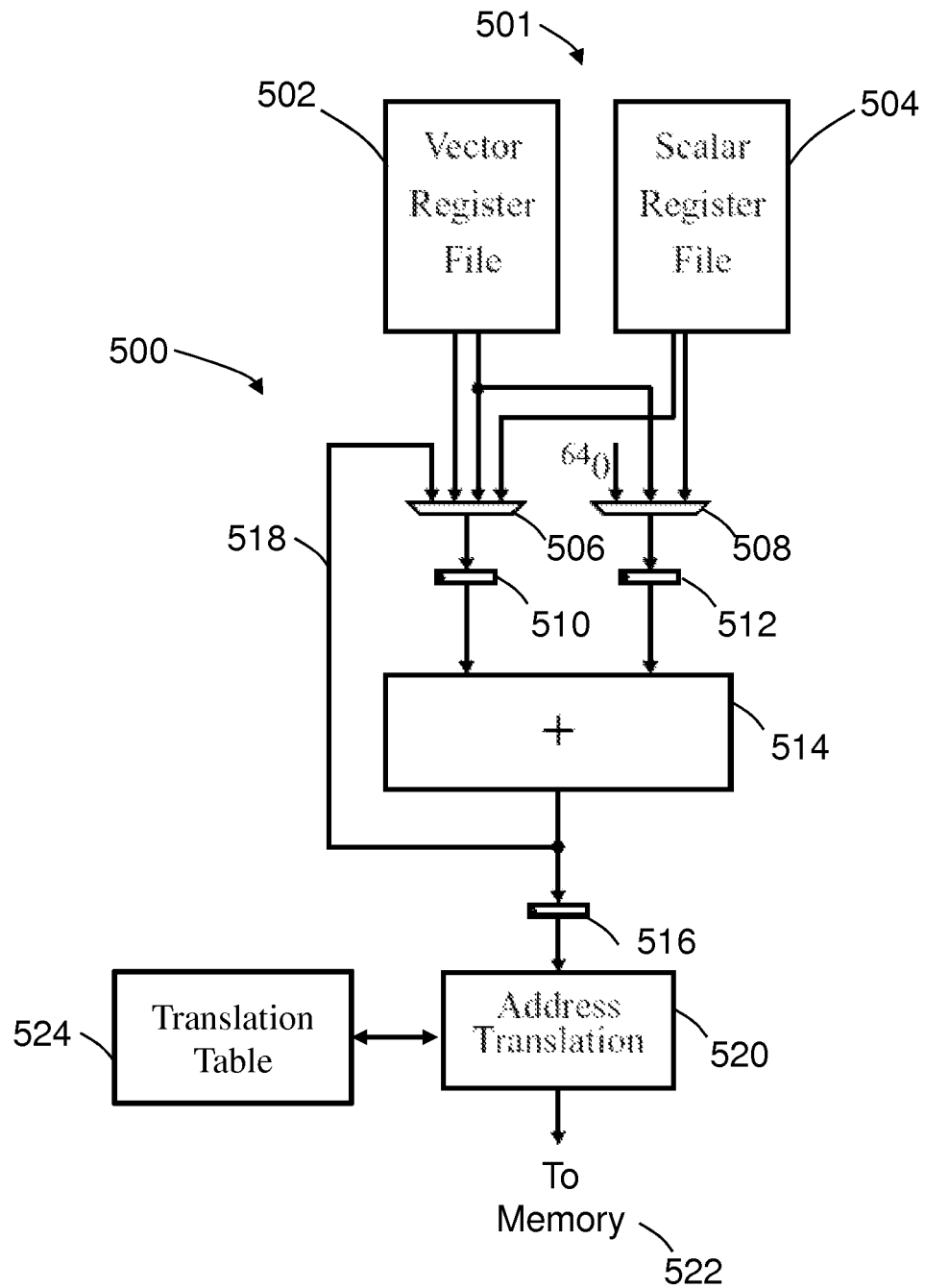
FIG. 5 illustrates an example of address generation logic in a processing element of an active memory device in accordance with an embodiment.

FIG. 5 illustrates an example of address generation logic 500 in a processing element of an active memory device in accordance with an embodiment. For example, the address generation logic 500 can represent a portion of the processing element 400 of FIG. 4. In an exemplary embodiment, the address generation logic 500 is coupled to a register file group

501. The register file group 501 can include one or more register files, such as a vector register file 502 and a scalar register file 504. The vector register file 502 includes a plurality of vector entries, each with a plurality of elements. For example, the vector register file 502 can be equivalent to the VCR 414 of FIG. 4 or a portion thereof. The scalar register file 504 includes a plurality of elements and can be equivalent to the SCR 416 of FIG. 4 or a portion thereof.

The address generation logic 500 includes multiplexers 506 and 508 that select inputs to latches 510 and 512. In an exemplary embodiment, the multiplexer 506 receives a plurality of inputs from the vector register file 502 and an input from the scalar register file 504. The multiplexer 508 can receive inputs from the vector register file 502 and the scalar register file 504. Outputs of the latches 510 and 512 can be coupled to an arithmetic function 514, such as an adder. The output of the arithmetic function 514 is passed to a latch 516, and a feedback path 518 can route the output of the arithmetic function 514 back to multiplexer 506. The value held in the latch 510 may be considered a base address value and the value held in the latch 512 may be considered an offset address value. Alternatively, the value held in the latch 510 may be considered an offset address value and the value held in the latch 512 may be considered a base address value. The base address value and the offset address value can be initially read from the register file group 501 from either the vector register file 502 or the scalar register file 504 depending upon system configuration.

The output of latch 516 is passed to address translation logic 520. The value held in latch 516 can be considered a virtual address which may need further modification to become a physical address suitable to address a location in memory. The address translation logic 520 may be equivalent to the ERAT 422 of FIG. 4. The address translation logic 520 can access a translation table 524 to perform a lookup of the translation table 524 based on the virtual address held in latch 516. Alternatively or additionally, the address translation logic 520 can apply an arithmetic function to the virtual address held in latch 516, such as adding a further offset or shifting bits of the virtual address to output a physical address at output 522 to access a location in memory of an active memory device. The output 522 may pass through additional elements, such as LSQ 404 of FIG. 4 and a memory controller before reaching a memory device of the active memory device.

The vector processing architecture of the processing element 400 of FIG. 4 and the address generation logic 500 of FIG. 5 can be leveraged to perform multiple memory accesses based on a single instruction executed locally with the processing element 400 of FIG. 4, and therefore locally to an active memory device. The feedback path 518 of FIG. 5 can allow a sequence of addresses to be generated based on a single base address value and a single offset address value. For instance, the scalar register file 504 can include the base address value and the offset address value that are read and latched into latches 510 and 512. A single vector read (load) instruction executed by the processing element 400 of FIG. 4 can sequentially add the base address value and the offset address value at arithmetic function 514 to form a virtual address and a corresponding physical address, feeding the virtual address back as an intermediate sum on feedback path 518 for subsequent use. The sequence of address generation can continue for a predetermined number of iterations with results of the sequence of reads to a plurality of locations in the memory returned to the vector register file 502. A zero input at multiplexer 508 can be used as an initial value for the offset address value for a first access.

A first vector read example (example 1) is further illustrated in tables 1 and 2. For ease of explanation, in this example it is assumed that the vector register file 502 has a vector length of four elements. Here, a single read instruction executed by a processing element in an active memory device reads the base address value from index 0 of the scalar register file 504, forms a corresponding virtual and physical address to read a memory location in the active memory device and loads the result into index 0 of register 0 of the vector register file 502. The read sequence automatically continues as part of execution of the same read instruction to read the offset address value at index 1 of the scalar register file 504, add the base address value and the offset address value to form a corresponding virtual and physical address to read a memory location in the active memory device, and load the result into index 1 of register 0 of the vector register file 502. The feedback path 518 can pass back the sum of the base address value and the offset address value as an intermediate sum to store in latch 510, while latch 512 retains the offset address value. The read sequence automatically continues as part of execution of the same read instruction to form a virtual address and corresponding physical address based on the base address value plus two times the offset address value (i.e., base address value+offset address value+offset address value). The corresponding memory location in the active memory device is read, and the result is loaded into index 2 of register 0 of the vector register file 502. The process continues for a predetermined number of iterations, which in this example is the vector length of the vector register file 502 to populate all four values. The predetermined number of iterations can alternatively be less than the vector length of the vector register file 502. A similar write operation may be performed where the values in the vector register file 502 for a given vector register, e.g., register 0 of table 2, are used as the write data and address values are generated from the scalar register file 504 in a similar manner based on a single write instruction executed by a processing element in an active memory device.

TABLE 1

Scalar register file for read example 1

| Scalar Register File Index | Scalar Register File Value |
|---|---|
| 0 | [Base Address Value] |
| 1 | [Offset Address Value] |
| 2 | — |
| 3 | — |

TABLE 2

Vector register file for read example 1

| Vector Register File Register 0 Index | Vector Register File Register 0 Value |
|---|---|
| 0 | Value @ [Base Address Value] |
| 1 | Value @ [Base Address Value + Offset Address Value] |
| 2 | Value @ [Base Address Value + 2 * Offset Address Value] |
| 3 | Value @ [Base Address Value + 3 * Offset Address Value] |

In another example, a second vector read example (example 2) is further illustrated in tables 3, 4, and 5. For ease of explanation, in this example it is assumed that the vector register file 502 has a vector length of four elements. Here, a single read instruction executed by a processing element in an active memory device reads the base address value as a vector from vector register 0 of vector register file 502, which includes four separate base address value elements. The offset address value is read from index 0 of the scalar register file 504 to form a sequence of virtual addresses and corresponding physical addresses by incrementally adding the offset address value and the base address value for each element of vector register 0 of the vector register file 502, and translating the sequence of virtual addresses to the corresponding physical addresses for a predetermined number of iterations. Values read from the corresponding memory locations in the active memory device are stored to sequential element locations in vector register 1 of vector register file 502 as illustrated in table 5 for example 2. Write operations may be performed in a similar manner with respect to vector register file 502 and scalar register file 504, resulting in multiple writes based on a single write instruction executed by a processing element in an active memory device.

TABLE 3

Scalar register file for read example 2

| Scalar Register File Index | Scalar Register File Value |
|---|---|
| 0 | [Offset Address Value] |
| 1 | — |
| 2 | — |
| 3 | — |

TABLE 4

Vector register file for read example 2

| Vector Register File Register 0 Index | Vector Register File Register 0 Value |
|---|---|
| 0 | [Base Address Value 1] |
| 1 | [Base Address Value 2] |
| 2 | [Base Address Value 3] |
| 3 | [Base Address Value 4] |

TABLE 5

Vector register file for read example 2

| Vector Register File Register 1 Index | Vector Register File Register 1 Value |
|---|---|
| 0 | Value @ [Base Address Value 1 + Offset Address Value] |
| 1 | Value @ [Base Address Value 2 + Offset Address Value] |
| 2 | Value @ [Base Address Value 3 + Offset Address Value] |
| 3 | Value @ [Base Address Value 4 + Offset Address Value] |

In another example, a third vector read example (example 3) is further illustrated in tables 6, 7, 8, and 9 as an alternate embodiment of example 2. Using the same tables 3 and 4 of example 2, example 3 illustrates an address generation sequence that uses a sequence of base address values in elements of vector register 0 of the vector register file 502 of table 4 in combination with the offset address value of table 3 to create a read sequence across vector registers 1, 2, 3, and 4 of vector register file 502. Write operations may be performed in a similar manner with respect to vector register file 502 and scalar register file 504, resulting in multiple writes.

TABLE 6

Vector register file for read example 3

| Vector Register File Register 1 Index | Vector Register File Register 1 Value |
|---|---|
| 0 | Value @ [Base Address Value 1] |
| 1 | Value @ [Base Address Value 1 + Offset Address Value] |
| 2 | Value @ [Base Address Value 1 + 2 * Offset Address Value] |
| 3 | Value @ [Base Address Value 1 + 3 * Offset Address Value] |

TABLE 7

Vector register file for read example 3

| Vector Register File Register 2 Index | Vector Register File Register 2 Value |
|---|---|
| 0 | Value @ [Base Address Value 2] |
| 1 | Value @ [Base Address Value 2 + Offset Address Value] |
| 2 | Value @ [Base Address Value 2 + 2 * Offset Address Value] |
| 3 | Value @ [Base Address Value 2 + 3 * Offset Address Value] |

TABLE 8

Vector register file for read example 3

| Vector Register File Register 3 Index | Vector Register File Register 3 Value |
|---|---|
| 0 | Value @ [Base Address Value 3] |
| 1 | Value @ [Base Address Value 3 + Offset Address Value] |
| 2 | Value @ [Base Address Value 3 + 2 * Offset Address Value] |
| 3 | Value @ [Base Address Value 3 + 3 * Offset Address Value] |

TABLE 9

Vector register file for read example 3

| Vector Register File Register 4 Index | Vector Register File Register 4 Value |
|---|---|
| 0 | Value @ [Base Address Value 4] |
| 1 | Value @ [Base Address Value 4 + Offset Address Value] |
| 2 | Value @ [Base Address Value 4 + 2 * Offset Address Value] |
| 3 | Value @ [Base Address Value 4 + 3 * Offset Address Value] |

In another example, a fourth vector read example (example 4) is further illustrated in tables 10, 11, and 12. For ease of explanation, in this example it is assumed that the vector register file 502 has a vector length of four elements. Here, a single read instruction executed by a processing element in an active memory device reads the base address value as a vector from vector register 0 of vector register file 502, which includes four separate base address value elements. The offset address value is read as a vector from vector register 1, which includes four separate offset address value elements.

Example 4 sequentially generates a sequence of virtual addresses and corresponding physical addresses by vector addition of the base address value (table 10) and the offset address value (table 11) for each vector element of the first and second vectors of the vector register file 502, and translates the sequence of virtual addresses to the corresponding physical addresses to access a plurality of locations in the memory. Values read from the corresponding memory locations in the active memory device are stored to sequential element locations in vector register 2 of vector register file 502 as illustrated in table 12 for example 4. Write operations may be performed in a similar manner with respect to vector register file 502, resulting in multiple writes based on a single write instruction executed by a processing element in an active memory device.

TABLE 10

Vector register file for read example 4

| Vector Register File Register 0 Index | Vector Register File Register 0 Value |
|---|---|
| 0 | [Base Address Value 1] |
| 1 | [Base Address Value 2] |
| 2 | [Base Address Value 3] |
| 3 | [Base Address Value 4] |

TABLE 11

Vector register file for read example 4

| Vector Register File Register 1 Index | Vector Register File Register 1 Value |
|---|---|
| 0 | [Offset Address Value 1] |
| 1 | [Offset Address Value 2] |
| 2 | [Offset Address Value 3] |
| 3 | [Offset Address Value 4] |

TABLE 12

Vector register file for read example 4

| Vector Register File Register 2 Index | Vector Register File Register 2 Value |
|---|---|
| 0 | Value @ [Base Address Value 1 + Offset Address Value 1] |
| 1 | Value @ [Base Address Value 2 + Offset Address Value 2] |
| 2 | Value @ [Base Address Value 3 + Offset Address Value 3] |
| 3 | Value @ [Base Address Value 4 + Offset Address Value 4] |

Figure 6:
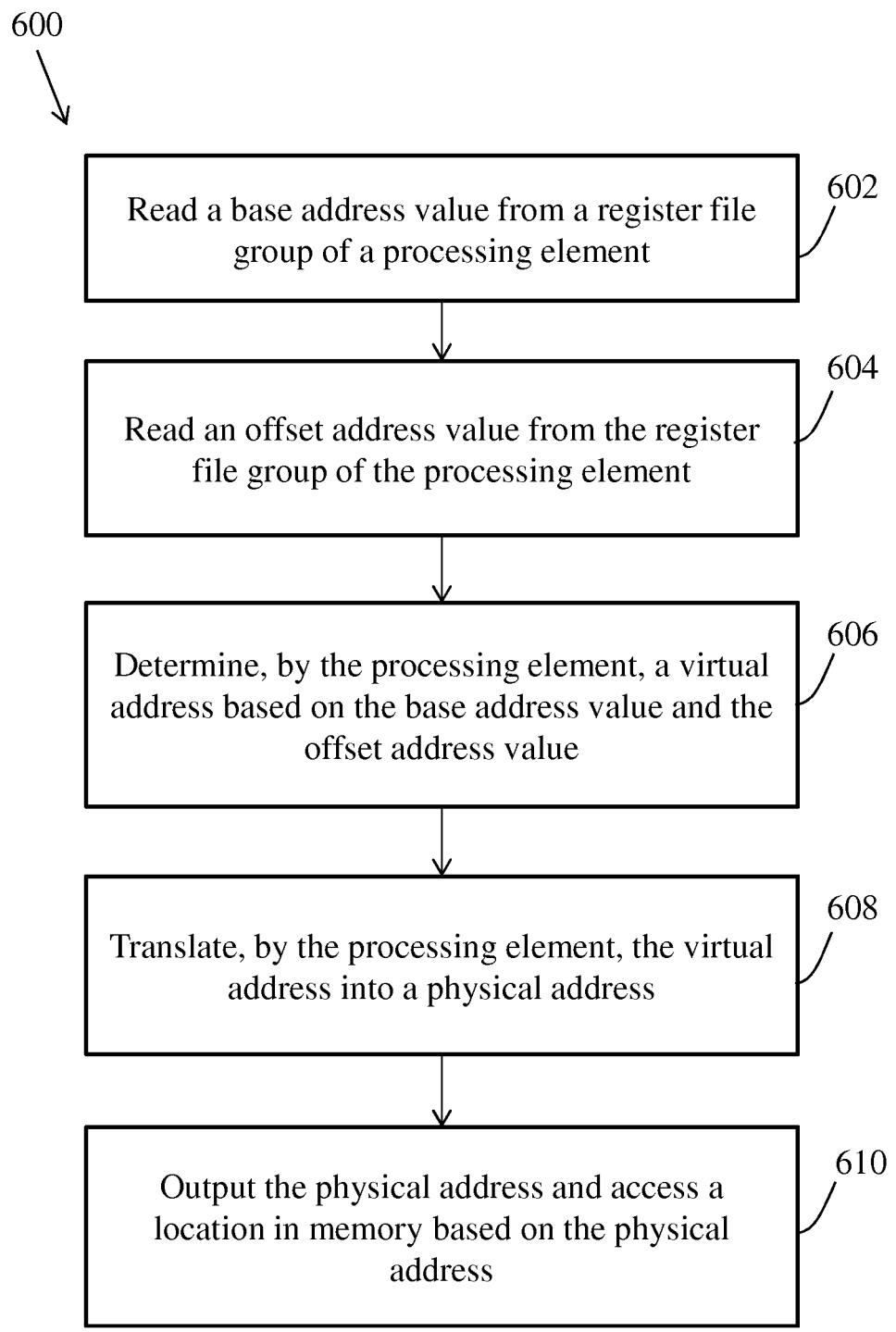
FIG. 6 illustrates a flow diagram of a process for address generation in a processing element of an active memory device in accordance with an embodiment.

FIG. 6 is a process 600 for address generation in a processing element of an active memory device, such as the active memory devices of FIGS. 1-3. The blocks depicted in FIG. 6 may be performed by one of the processing elements of FIGS. 1-4 in an active memory device. For example, the blocks may be performed by a processing element in an active memory device, where the processing element accesses portions of memory (e.g., memory vaults sharing a stack with the processing element) and performs operations on data accessed from the memory. For purposes of explanation, the processing element is described in reference to processing element 400 of FIG. 4 and address generation logic 500 of FIG. 5.

At block 602, address generation logic 500 in processing element 400 of an active memory device reads a base address value from register file group 501 of the processing element 400. The base address value can be read from the vector register file 502 or the scalar register file 504. The base address value can be held in latch 510 after passing through multiplexer 506. At block 604, address generation logic 500 reads an offset address value from register file group 501 of the processing element 400. The offset address value can be read from the vector register file 502 or the scalar register file 504. The offset address value can be held in latch 512 after passing through multiplexer 508. The base address value and the offset address value can be received from a main processor in communication with the processing element 400 and stored in the register file group 501 of the processing element 400 prior to reading the base and offset address values from register file group 501. The base and offset address values can be vector or scalar values.

At block 606, address generation logic 500 in processing element 400 determines a virtual address based on the base address value and the offset address value. For example, arithmetic function 514 can be used to add the base address value and the offset address value. At block 608, address generation logic 500 in processing element 400 translates the virtual address into a physical address. Translating the virtual address into the physical address can include performing a lookup of a translation table 524 based on the virtual address. At block 610, the processing element 400 outputs the physical address and accesses a location in the memory of the active memory device based on the physical address.

As previously described, the register file group 501 can include the vector register file 502 and the scalar register file 504. The base address value and the offset address value can be read from the scalar register file 504. The sequence of virtual addresses and corresponding physical addresses may be generated sequentially by incrementally adding the offset address to the base address value and subsequent intermediate sums, and translating the sequence of virtual addresses to the corresponding physical addresses for a predetermined number of iterations. The predetermined number of iterations may be based on a vector length of the vector register file 502. Based on a single read instruction executed by the processing element 400, a sequential read operation can be performed by accessing a plurality of locations in the memory based on the sequence of virtual addresses and corresponding physical addresses, and writing values read at the plurality of locations in the memory to the vector register file 502. Similarly, based on a single write instruction executed by the processing element 400, a sequential write operation can be performed by sequentially reading values from the vector register file and writing the values to the plurality of locations in the memory based on the sequence of virtual addresses and corresponding physical addresses.

Alternatively, the base address value can be read as a vector from the vector register file 502, and the offset address value can be read from the scalar register file 504. A sequence of virtual addresses and corresponding physical addresses may be sequentially generated by adding the offset address value and the base address value for each element of the vector of the vector register file 502, and translating the sequence of virtual addresses to the corresponding physical addresses for a predetermined number of iterations.

As a further alternative, the base address value can be read as a first vector from the vector register file 502, and the offset address value can be read as a second vector from the vector register file 502. A sequence of virtual addresses and corresponding physical addresses may be sequentially generated by vector addition of the offset address value and the base address value for each vector element of the first and second vectors of the vector register file 502, and translating the sequence of virtual addresses to the corresponding physical addresses to access a plurality of locations in the memory.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for address generation in an active memory device that is a three-dimensional memory device comprising memory divided into three-dimensional blocked regions as memory vaults, one or more memory controllers, and a processing element coupled to an interconnect network, the method comprising:

receiving a base address value and an offset address value from a main processor in communication with the processing element through the interconnect network;

storing the base address value and the offset address value in a register file group of the processing element, wherein the register file group comprises a scalar register file and a vector register file, and a load-store queue is coupled to the scalar register file, the vector register file, the interconnect network, and an effective-to-real address translation unit;

reading the base address value from the register file group of the processing element;

reading the offset address value from the register file group of the processing element; based on reading the base address value from the scalar register file and the offset address value from the scalar register file, sequentially generating a sequence of virtual addresses and corresponding physical addresses by incrementally adding the offset address value to the base address value and subsequent intermediate sums, and translating the sequence of virtual addresses to the corresponding physical addresses by the effective-to-real address translation unit for a predetermined number of iterations, wherein the predetermined number of iterations is based on a vector length of the vector register file; and accessing a plurality of locations in the memory vaults through the one or more memory controllers via the interconnect network based on the physical addresses.

2. The method of claim 1, further comprising:

based on a single read instruction executed by the processing element, performing a sequential read operation by accessing the plurality of locations in the memory based on the sequence of virtual addresses and corresponding physical addresses, and writing values read at the plurality of locations in the memory to the vector register file; and based on a single write instruction executed by the processing element, performing a sequential write operation by sequentially reading values from the vector register file and writing the values to the plurality of locations in the memory based on the sequence of virtual addresses and corresponding physical addresses.

3. The method of claim 1, further comprising:

based on reading the base address value as a vector from the vector register file and the offset address value from the scalar register file, sequentially generating the sequence of virtual addresses and corresponding physical addresses by adding the offset address value and the base address value for each element of the vector of the vector register file, and translating the sequence of virtual addresses to the corresponding physical addresses for the predetermined number of iterations.

4. The method of claim 1, further comprising:

based on reading the base address value as a first vector from the vector register file and the offset address value as a second vector from the vector register file, sequentially generating the sequence of virtual addresses and corresponding physical addresses by vector addition of the offset address value and the base address value for each vector element of the first and second vectors of the vector register file, and translating the sequence of virtual addresses to the corresponding physical addresses to access a plurality of locations in the memory.

5. The method of claim 1, wherein translating the virtual addresses into the physical addresses further comprises performing a lookup of a translation table based on the virtual addresses.

6. A processing element of an active memory device that is a three-dimensional memory device comprising memory divided into three-dimensional blocked regions as memory vaults and one or more memory controllers, the processing element coupled to an interconnect network and comprising:

a register file group comprising one or more register files, wherein the register file group comprises a scalar register file and a vector register file, and a load-store queue is coupled to the scalar register file, the vector register file, the interconnect network, and an effective-to-real address translation unit; and address generation logic coupled to the register file group and configured to perform a method comprising:

reading a base address value from the register file group received from a main processor in communication with the processing element through the interconnect network and stored as the base address value in the register file group;

reading an offset address value from the register file group received from the main processor in communication with the processing element and stored as the offset address value in the register file group;

based on reading the base address value from the scalar register file and the offset address value from the scalar register file, sequentially generating a sequence of virtual addresses and corresponding physical addresses by incrementally adding the offset address value to the base address value and subsequent intermediate sums, and translating the sequence of virtual addresses to the corresponding physical addresses by the effective-to-real address translation unit for a predetermined number of iterations, wherein the predetermined number of iterations is based on a vector length of the vector register file; and outputting the physical addresses to access a plurality of locations in the memory vaults of the active memory device by the processing element through the one or more memory controllers via the interconnect network.

7. The processing element of claim 6, wherein the processing element is further configured to perform:

based on a single read instruction executed by the processing element, performing a sequential read operation by accessing the plurality of locations in the memory based on the sequence of virtual addresses and corresponding physical addresses, and writing values read at the plurality of locations in the memory to the vector register file; and based on a single write instruction executed by the processing element, performing a sequential write operation by sequentially reading values from the vector register file and writing the values to the plurality of locations in the memory based on the sequence of virtual addresses and corresponding physical addresses.

8. The processing element of claim 6, wherein the address generation logic is further configured to perform:

based on reading the base address value as a vector from the vector register file and the offset address value from the scalar register file, sequentially generating the sequence of virtual addresses and corresponding physical addresses by adding the offset address value and the base address value for each vector element of the vector register file, and translating the sequence of virtual addresses to the corresponding physical addresses for the predetermined number of iterations.

9. The processing element of claim 6, wherein the address generation logic is further configured to perform:

based on reading the base address value as a first vector from the vector register file and the offset address value as a second vector from the vector register file, sequentially generating the sequence of virtual addresses and corresponding physical addresses by vector addition of the offset address value and the base address value for each vector element of the first and second vectors of the vector register file, and translating the sequence of virtual addresses to the corresponding physical addresses to access a plurality of locations in the memory.

10. The processing element of claim 6, further comprising a translation table, wherein translating the virtual addresses into the physical addresses further comprises performing a lookup of the translation table based on the virtual addresses.

11. An active memory device comprising:

memory divided into three-dimensional blocked regions as memory vaults;

one or more memory controllers; and a processing element coupled to an interconnect network and comprising a register file group and address generation logic coupled to the register file group, wherein the register file group comprises a scalar register file and a vector register file, a load-store queue is coupled to the scalar register file, the vector register file, the interconnect network, and an effective-to-real address translation unit, and the address generation logic is configured to perform a method comprising:

receiving a base address value and an offset address value from a main processor in communication with the processing element through the interconnect network;

storing the base address value and the offset address value in the register file group of the processing element;

reading the base address value from the register file group;

reading the offset address value from the register file group;

based on reading the base address value from the scalar register file and the offset address value from the scalar register file, sequentially generating a sequence of virtual addresses and corresponding physical addresses by incrementally adding the offset address value to the base address value and subsequent intermediate sums, and translating the sequence of virtual addresses to the corresponding physical addresses by the effective-to-real address translation unit for a predetermined number of iterations, wherein the predetermined number of iterations is based on a vector length of the vector register file; and outputting the physical addresses to access a plurality of locations in the memory vaults through the one or more memory controllers via the interconnect network.

12. The active memory device of claim 11, wherein the processing element is further configured to perform:

based on a single read instruction executed by the processing element, performing a sequential read operation by accessing the plurality of locations in the memory based on the sequence of virtual addresses and corresponding physical addresses, and writing values read at the plurality of locations in the memory to the vector register file; and based on a single write instruction executed by the processing element, performing a sequential write operation by sequentially reading values from the vector register file and writing the values to the plurality of locations in the memory based on the sequence of virtual addresses and corresponding physical addresses.

13. The active memory device of claim 11, wherein the address generation logic is further configured to perform:

based on reading the base address value as a vector from the vector register file and the offset address value from the scalar register file, sequentially generating the sequence of virtual addresses and corresponding physical addresses by adding the offset address value and the base address value for each element of the vector of the vector register file, and translating the sequence of virtual addresses to the corresponding physical addresses for the predetermined number of iterations.

14. The active memory device of claim 11, wherein the address generation logic is further configured to perform:

based on reading the base address value as a first vector from the vector register file and the offset address value as a second vector from the vector register file, sequentially generating the sequence of virtual addresses and corresponding physical addresses by vector addition of the offset address value and the base address value for each vector element of the first and second vectors of the vector register file, and translating the sequence of virtual addresses to the corresponding physical addresses to access a plurality of locations in the memory.

15. The active memory device of claim 11, further comprising a translation table in the processing element, wherein translating the virtual addresses into the physical addresses further comprises performing a lookup of the translation table based on one or more of: the virtual addresses and the base address value.

* * * * *